(12) United States Patent
Jones et al.

(10) Patent No.: US 10,825,041 B1
(45) Date of Patent: Nov. 3, 2020

(54) REAL-TIME OPTIMIZATION OF BID SELECTION

(71) Applicants: Nathan Jones, Corona, CA (US); Michael Radford, Sierra Madre, CA (US); Alba Serrano, Pasadena, CA (US)

(72) Inventors: Nathan Jones, Corona, CA (US); Michael Radford, Sierra Madre, CA (US); Alba Serrano, Pasadena, CA (US)

(73) Assignee: UBERMEDIA, INC., Pasadena, CA (US)

( * ) Notice: Subject to any disclaimer, the term of this patent is extended or adjusted under 35 U.S.C. 154(b) by 314 days.

(21) Appl. No.: 15/141,609

(22) Filed: Apr. 28, 2016

Related U.S. Application Data

(60) Provisional application No. 62/155,998, filed on May 1, 2015, provisional application No. 62/248,593, filed on Oct. 30, 2015.

(51) Int. Cl.
    *G06Q 30/02* (2012.01)

(52) U.S. Cl.
    CPC ..... *G06Q 30/0242* (2013.01); *G06Q 30/0255* (2013.01); *G06Q 30/0277* (2013.01)

(58) Field of Classification Search
    None
    See application file for complete search history.

(56) References Cited

U.S. PATENT DOCUMENTS

2008/0046316 A1* 2/2008 Shah ................. G06Q 30/02
    705/14.43
2010/0138291 A1* 6/2010 Silverman ............. G06Q 30/02
    705/14.45
2015/0073893 A1* 3/2015 Brown ............... G06Q 30/0246
    705/14.45
2015/0088665 A1* 3/2015 Karlsson ........... G06Q 30/0275
    705/14.71
2015/0235258 A1* 8/2015 Shah ................. G06Q 30/0242
    705/14.45
2016/0042407 A1* 2/2016 Els .................... G06Q 30/0275
    705/14.71
2017/0323230 A1* 11/2017 Bailey .................. G06Q 30/02

OTHER PUBLICATIONS

Watson, Ching Tai. "Essays on Asset Pricing" Diss. University of California, Los Angeles, 2004. (Year: 2004).*

* cited by examiner

*Primary Examiner* — Michael J Sittner
(74) *Attorney, Agent, or Firm* — Andrew S. Naglestad

(57) ABSTRACT

The invention features a system and method for finely tuning the rate at which ad impressions are delivered to users based on various metrics used to characterize the quality of the ad opportunities. With the present invention, more relevant ads can be selected and delivered to a wide range of recipients while still compensating for the variations in the volume of Internet traffic and usage over the course of the day. The system and method of the present invention employ a plurality of bid boundaries corresponding to different volumes of ad opportunities, thereby enabling the invention to adjust the number of ad opportunities sought over the course of day while consistently targeting the mix of ad opportunities yielding the highest response rates and margin. The bid boundaries are selected in real-time based on the behavior of prior ad recipients. The behavior may include click-through rates or entry into a geo-fence, for example.

1 Claim, 7 Drawing Sheets

REAL-TIME OPTIMIZATION OF BID SELECTION

CROSS-REFERENCE TO RELATED APPLICATION(S)

This application claims the benefit of U.S. Provisional Patent Application Ser. No. 62/155,998 filed May 1, 2015, titled "OPTIMIZED ADVERTISING SYSTEM AND METHOD FOR REAL-TIME BIDDING PLATFORMS," and claims the benefit of U.S. Provisional Patent Application Ser. No. 62/248,593 filed Oct. 30, 2015, titled "REAL-TIME LOCATION OPTIMIZATION IN ADVERTIZING PLATFORM," both of which are hereby incorporated by reference herein for all purposes.

TECHNICAL FIELD

The invention generally relates to the delivery of content over the Internet. In particular, the invention relates to a manner of selecting the recipients of the content in order to adjust the volume of content transmitted.

BACKGROUND

Real-time bidding (RTB) exchanges are used to buy and sell advertising on a per-impression basis. A RTB network brings advertisers together with publishers that display advertisements at the moment ad opportunities arise. The publishers that display advertising generally operate websites or mobile applications, for example, that need to be monetized. The RTB generally host real-time auctions in which a publisher submits an opportunity to display an advertisement to a particular individual the moment it is needed, and multiple advertisers complete to have their ad displayed to that user. The auction generally includes information about the webpage or software application, the context in which the ad will be shown, as well as information about the user to which the ad will be displayed. The auction is completed within a fraction of a second and the winning ad instantly displayed to the user on the publisher's site/application. Bids are automatically generated by software configured by the advertisers, and the bid amounts are determined based on a number of factors including advertising budgets, the publisher, and the user demographic information, browsing history, location, for example.

Numerous advertisers use advertiser bid systems to submit bids to RTB exchanges and distribute relevant ads to users. These advertiser bid systems, however, are not effectively optimized, which results in advertisers bidding too much to deliver ads with little relevance to some users while bidding too little to deliver ads to other users for which the ad is highly relevant. As a result, advertisers often over-bid for ad opportunities that produce relatively low response rates desired by the advertisers while losing auctions for ad opportunities associated with quality customers. This also impacts the advertiser's ability to deliver ad impressions at a volume sufficient to produce the meaningful customer response rates. There is, therefore, a need for a system and method that effectively minimizes the amount paid for ad opportunities while maximizing the effectiveness of the advertising while still hitting target volume rates.

SUMMARY

The invention features a system and method for finely tuning the rate at which ad impressions are delivered to users based on various metrics used to characterize the quality of the ad opportunities. With the present invention, more relevant ads can be selected and delivered to a wide range of recipients while still compensating for the variations in volume over the course of the day.

The system in the present invention includes a memory configured to store a plurality of bid boundaries, each bid boundary corresponding to a different target rate for distributing a digital ad impression. The system further includes a processor configured to: receive an ad campaign associated with a desired user action; select a one of the plurality of bid boundaries; identify a first plurality of recipients that match the ad campaign, the number of identified recipients determined, in part, based on the one of the plurality of bid boundaries selected; transmit a digital ad impression to the first plurality of recipients; determine which of the first plurality of recipients entered the geo-fence after transmitting the digital ad impression; select a new one of the plurality of bid boundaries based on the which of the first plurality of recipients entered the geo-fence after transmitting the digital ad impression; identify in real-time a second plurality of recipients that match said ad campaign based, in part, on the first plurality of recipients that entered the geo-fence and the new one of the plurality of bid boundaries selected; and determine which of the second plurality of recipients entered the geo-fence.

A target rate is an average frequency at which digital ad impressions are delivered to recipients. In addition, each of the plurality of bid boundaries classifies a plurality of ad opportunities based, in part, on a predicted margin. Each of the plurality of bid boundaries may also classify ad opportunities based, in part, on predicted user behavior. The predicted user behavior may be a prediction that the user will enter the geo-fence.

BRIEF DESCRIPTION OF THE DRAWINGS

The present invention is illustrated by way of example and not limitation in the figures of the accompanying drawings, and in which.

DETAILED DESCRIPTION OF THE PREFERRED EMBODIMENT

Figure 6:
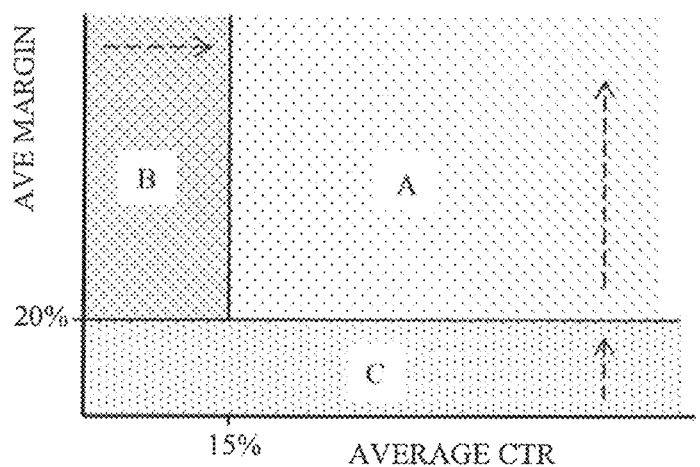
FIG. 6 is an evaluation chart for comparing candidate bid boundaries, in accordance with the preferred embodiment of the present invention.
Figure 7:
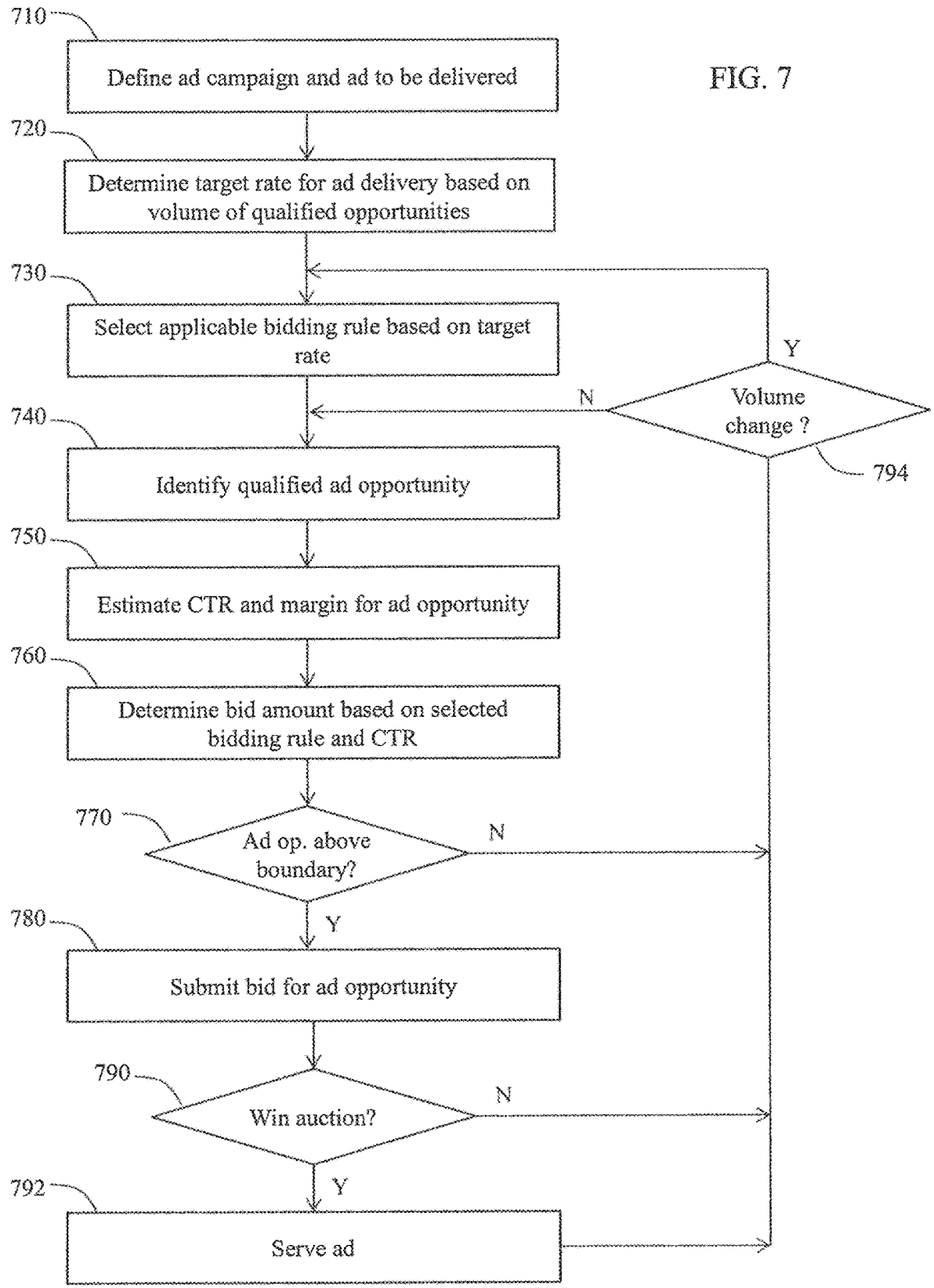
FIG. 7 is a flowchart of automated bidding in real-time auctions, in accordance with the preferred embodiment of the present invention.

The process of configuring and implementing a dynamic bidding platform (DBP) for optimizing the bidding process in advertising auctions is describe herein. The process of configuring the DBP is illustrated in FIGS. 1 through 5 while the process of operating the DBP is illustrated in FIGS. 6 and 7.

Figure 1:
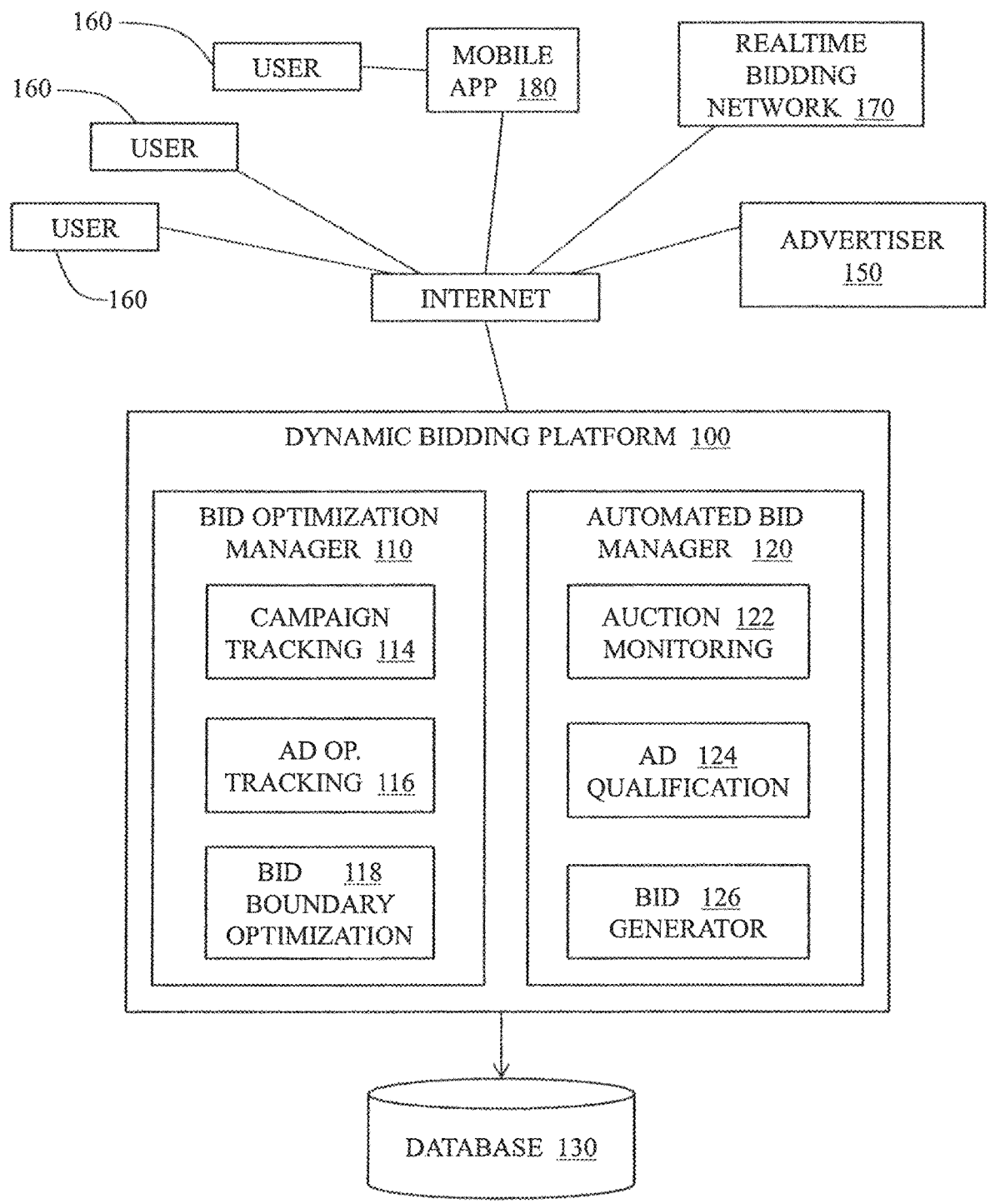
FIG. 1 is a functional block diagram of the dynamic bidding platform (DBP), in accordance with the preferred embodiment of the present invention.

Illustrated in FIG. 1 is a block diagram of the DBP 100 for optimizing the bidding process in advertising auctions, in accordance with the preferred embodiment of the present invention. The DBP is configured to interact with a plurality of advertisers 150, which generate advertising and advertising campaigns that are managed by the DBP 100. The DBP also interacts with at least one real-time bidding network (RBN) 170 which administers real-time auctions for ad impressions displayed to various users 160 via websites and mobile software applications 180, for example.

The DBP 100 includes a bid optimization manager 110 configured to identify relevant ad opportunities, and an automated bid manager 120 configured to interact with the real-time bidding network (RBN). The bid optimization manager 110 includes (a) a campaign tracking module 114 configured to manage advertising campaigns of various customers and advertisers 150, (b) an ad opportunity manager 116 configured to monitor auctions at the RBD 170 and record various data including auction prices and click-through information (or any other metric of performance or ad engagement including crossing or being observed within a geo-fence defined by GPS coordinates) if possible in local database 130, and (c) a bid boundary optimization manager configured to generate target bid volumes and ad impression rates based on current ad campaign criteria and past auction data.

The automated bid manager 120 preferably includes (a) an auction monitoring module 122 for detecting open auctions at the RBN in real-time, (b) an ad qualification manager configured to identify relevant auctions on which to bid, and (c) a bid generator 126 configured to automatically generate and submit bids for those relevant auctions.

Figure 2:
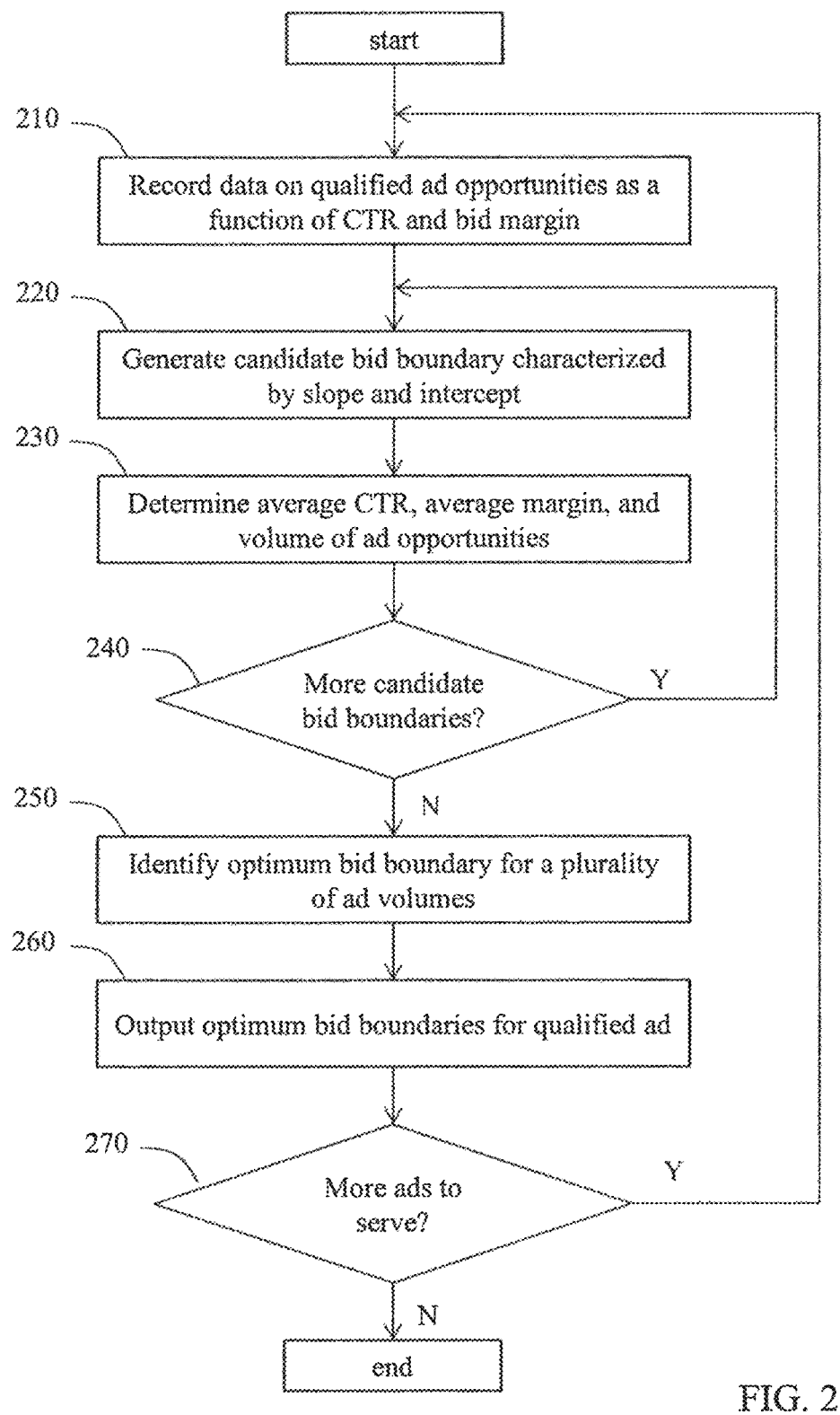
FIG. 2 is a flowchart of the process of configuring the DBP to perform automated bidding in real-time auctions, in accordance with the preferred embodiment of the present invention.

Illustrated in FIG. 2 is a flowchart of the process of configuring the DBP to perform automated bidding in real-time auctions. In step 210, the DBP collects and records a plurality of ad opportunities over a predetermined period of time. Each ad opportunity corresponds to an auction on a RBN. The information provided with each auction generally includes information about a user to which the wining ad will be presented along with information about the website, mobile application, or other environment in which the winner's ad will be placed. The DBP records 210 the ad opportunity in a database along with an estimate of the action rate (AR) as well as the bid margin. An action rate is the probability of the user taking an action desired by the advertiser after receiving the ad impression. Actions desired by the advertising may include, for example, being observed within a geo-fence around an advertiser's place of business, making a purchase, or clicking on the ad. The estimated action rate may be generated based on user behavior following the previous auctions. The data from the ad opportunities is generally compiled for a predetermined period of time between an hour and a week. New ad opportunity data may be added in real time and stale data purged as needed.

Figure 3:
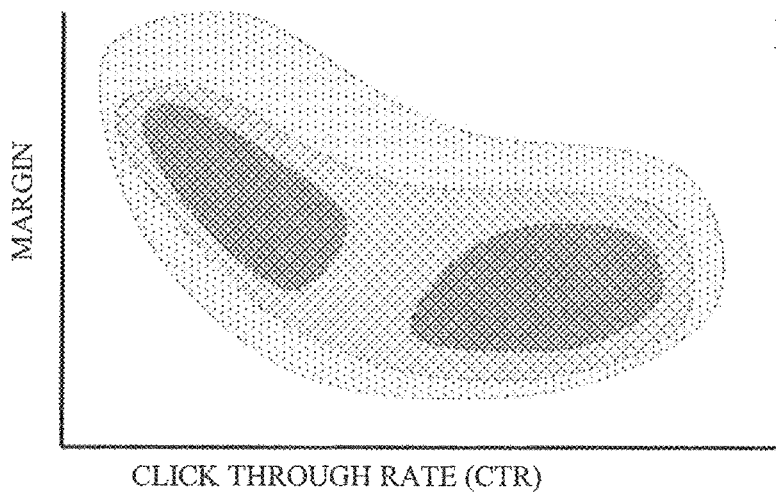
FIG. 3 is a contour plot of the number of ad opportunities as a function of margin and click-through rate, in accordance with the preferred embodiment of the present invention.
Figure 4:
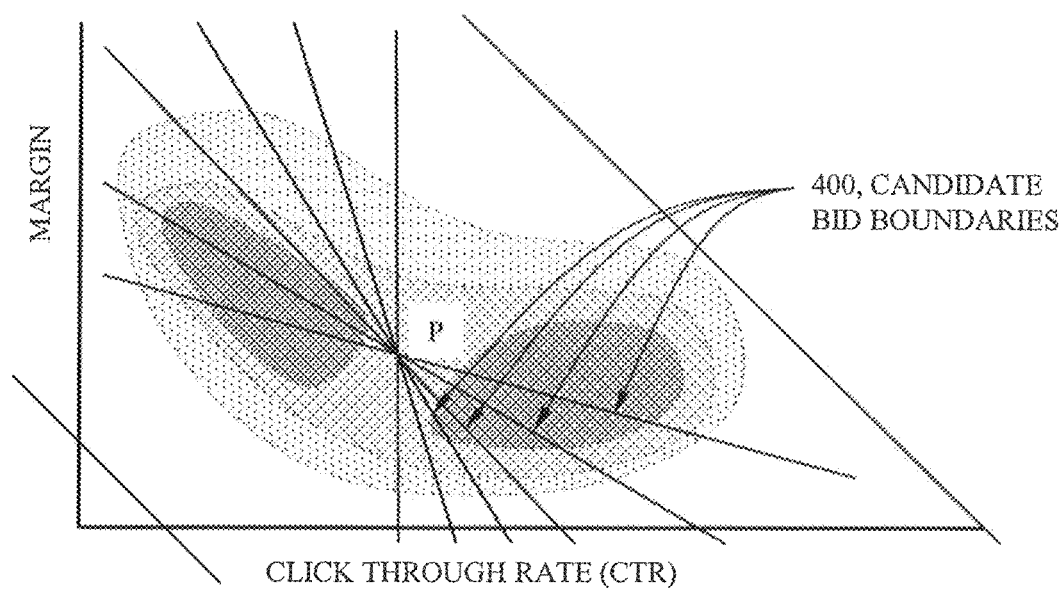
FIG. 4 is a plurality of candidate bid boundaries, in accordance with the preferred embodiment of the present invention.

The number and quality of ad opportunities can be represented graphically in a contour plot, as shown in FIG. 3, where the number of ad opportunities are plotted as a function of the action rate and bid margin. In the preferred embodiment, the x-axis represents the actual or anticipated click-through rate (or other action rate) while the y-axis represents the actual or predicted margin. The darker the region, the more ad opportunities there are at that click-through-rate and margin. The margin represents the fee received from an advertiser for the ad impression minus the amount paid to win the RBN auction. As can be seen in FIG. 3, there are a number of ad opportunities where (a) the estimated action rate is relative high but the margin low, and (b) the estimated action rate is low but the margin is relatively high. In addition, there are few ad opportunities with both high estimated action rate and high margin.

Referring to FIG. 2 again, the DBP of the preferred embodiment generates one or more bid boundaries which are used to determine which ad opportunities on which to bid and how much to bid. The optimum bid boundaries are selected from a plurality of potential bid boundaries generated 220 for each electronic advertisement campaign. A potential bid boundary, referred to herein as a "candidate" bid boundary, represents one of a number of potential bidding schemes to employ when participating in auctions at the RBN. Each candidate bid boundary, when mapped on the contour plot of FIG. 3, effectively classifies the ad opportunities into two groups. In particular, a candidate bid boundary divides the ad opportunities into (1) a first class comprising ad opportunities on which to bid, and (2) a second class comprising those ad opportunities not to bid on. The first class of ad opportunities fall above the bid boundary while the second class are below the bid boundary. A plurality of candidate bid boundaries are generated and evaluated for purposes of identifying a subset of boundary lines that yield optimal performance and profit. A few of the many candidate bid boundaries tested are represented by lines 400 in FIG. 4. In general, the candidate bid boundaries are generated for numerous different slopes at a plurality of different points, P (or y-axis intercepts). For each candidate bid boundary, the DBP computes 230 a plurality of metrics including an estimated click-through-rate (or other action desired by the advertiser) for the ad opportunities to the upper right side of the bid boundary, an average margin for those same ad opportunities, the probability of winning each particular auction based on the amount bid, and the total number (a.k.a, volume) of those ad opportunities predicted to win. These metrics effectively characterize the average ad performance if the DBP were to bid on those ad opportunities to the upper right of the candidate bid boundary. The process of generating 230 the metrics is repeated for a plurality of candidate bid lines until the contour plot is exhaustively covered.

When all the candidate bid boundaries are evaluated, the decision block 240 is answered in the negative. Thereafter, the DBP identifies 250 a subset of optimum bid boundaries from the plurality of candidate bid boundaries. An optimum bid boundary is one that yields a maximal combination of average estimated action rate and average bid margin for a given volume of ad opportunities on which bids are submitted. The optimum bid boundary is identified 250 for each of a plurality of unique target volumes. For a given volume, candidate bid boundaries are compared using various metrics as well as the evaluation chart illustrated in FIG. 6.

Figure 5:
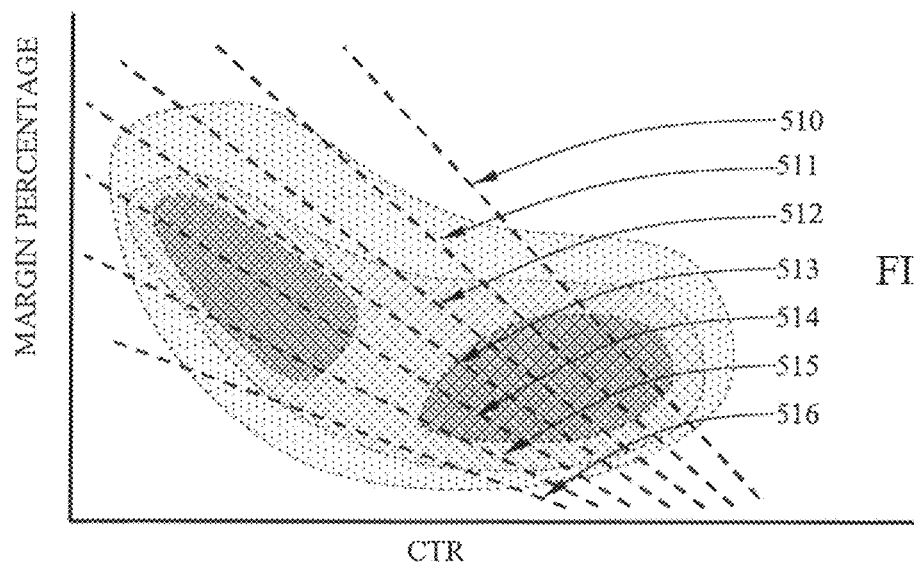
FIG. 5 is a plurality of optimum bid boundaries, in accordance with the preferred embodiment of the present invention.

A plurality of optimum bid boundaries 510-516 are shown in FIG. 5, each boundary corresponding to a different volume of ad opportunities for a predetermined period of time. The volume, i.e., the total number of ad opportunities predicted to be won, is the integral of the ad opportunities plotted to or otherwise represented to the upper right of the bid boundary and weighted by the chance of winning the auction for each ad opportunity. As can be seen, the optimum bid boundary 510 corresponds to the smallest fraction of the available ad volume when the total number of ad opportunities is high, for example. When the total number of ad opportunities is relatively low, however, bid boundary 516 is used to capture a larger percentage of the available ad opportunities.

The bid boundary 510 may be employed during the day at peak hours when there are more people online and more ad opportunities, thus enabling the DBP 100 to be more selective with regard to the quality of ad opportunities on which to bid. When used to select ads on which to bid, the bid boundary 510 generally yields relatively high action rates and margins. At night when there are fewer people online and fewer ad opportunities from which to choose, however, bid boundary 516 may be used to acquire a larger percentage of the available ad opportunities. The bid boundary 516 generally results in relatively low action rates and margins, as compared with the more selective bid boundary 510. The other bid boundaries 511-515 are used for intermediate volumes between bid boundary 510 and bid boundary 516. The set of optimum bid boundaries 510-516 is provided as output in step 260 to the automated bid manager 120 for real-time bidding decisions.

Steps 210 through 260 are executed for each individual ad campaign. If there are more ad campaigns being managed by the DBP, decision block 270 is answered in the affirmative and the process repeated for the next ad campaign. As can be appreciated, the contour plot of ad opportunities in FIG. 3, which consists of ad opportunities that satisfy the terms of an ad campaign, will vary as the campaign criteria vary for different ads.

Illustrated in FIG. 6 is a chart comprising a set of regions used to evaluate different candidate bid boundaries, as recited in step 250 of FIG. 2. In practice, two candidate bid boundaries are mapped into the chart where they are represented as two points. The candidate bid boundaries are compared based on where the two points fall in those region(s). The set of regions are distinguished based on the average estimated action rate and margin. The set of regions include a first region A, a second region B, and a third region C. In the preferred embodiment, the boundary at the upper side of region C coincides with a 20% expected average margin. One skilled in the art will appreciate that this boundary may be raised or lowered depending on the application. The boundary to the right of region B is a 15% click-through rate chosen to meet the advertiser's target response rate. The precise location of the boundary is subject to vary depending on the typical probability of the action or actions desired by the advertiser.

In general, a candidate bid boundary that maps to region A is selected over one that maps to region B, and a candidate bid boundary that maps to region B is selected over one that maps to region C. If two candidate bid boundaries both map into region C, for example, the candidate bid boundary that produces the largest average margin trumps a candidate bid boundary that produces a smaller margin. If the two candidate bid boundaries both map to region B, the candidate bid boundary that yields the highest average action rate trumps the one that yields the lower action rate. If the two candidate bid boundaries both map to region A, the candidate bid boundary that produces the largest average margin trumps the one that produces the smaller margin.

Illustrated in FIG. 7 is method used by DBP 100 to perform automated bidding in real-time auctions. When an advertising campaign is defined and the electronic advertisement selected 710, the DBP first determines 720 a target rate at which to distribute the ad via the RBN 170. The target rate represents the number of intended ad impressions to be delivered per hour, for example. The target rate is nearly constant over the duration of the ad campaign, although the volume of ad opportunities may vary widely depending on the time of day due to people's work patterns, web surfing behavior, events that occur over the course of the day, etc. To maintain a relatively constant target rate, the DBP frequently switches between the plurality of optimum bid boundaries in order to compensate for changes in the volume of ad opportunities. That is, the DBP selects 730 the one of the plurality of optimum bid boundaries that is expected to generate enough ad opportunities to yield the number of ad impressions specified by the ad campaign. With the bid boundary selected, the DBP begins to identify 740 qualified ad opportunities, which are auctions from the RBN that satisfy the campaign criteria set by the advertiser. If the ad opportunity is qualified, the DBP estimates 750 (a) the likelihood the ad recipient will subsequently perform the action desired by the advertiser, i.e., the expected click-through rate or other action rate, as well as (b) the anticipated margin earned for serving the ad. If an ad opportunity, when plotted in FIG. 3, produces a point that lies above the selected bid boundary, then decision block 770 is answered in the affirmative and a bid entered in the auction for the ad opportunity. The actual bid amount is generated using the bid boundary and the estimated action rate for that ad opportunity. The bid amount corresponds to the point at the intersection between the selected bid boundary and a vertical line coinciding with the estimated action rate. This determined bid amount is then submitted 780 in the RBN for the particular ad opportunity. If the auction is won, decision block 790 is answered in the affirmative and the ad served in accordance with the terms of the RBN.

The process of bidding on ad opportunities and serving ads on winning auctions is repeated for all qualified ads. In practice, the volume of qualified ad opportunities changes as more people start or end sessions at websites or on mobile apps, for example. If and when the volume of qualified ad opportunities changes, decision block 794 is answered in the affirmative and a new bid boundary selected. Even when the bid boundary changes, however, the DBP effectively changes the volume of ad opportunities on which to bid while maintaining the optimum combination of quality of ad opportunities and margin.

Figure 8:
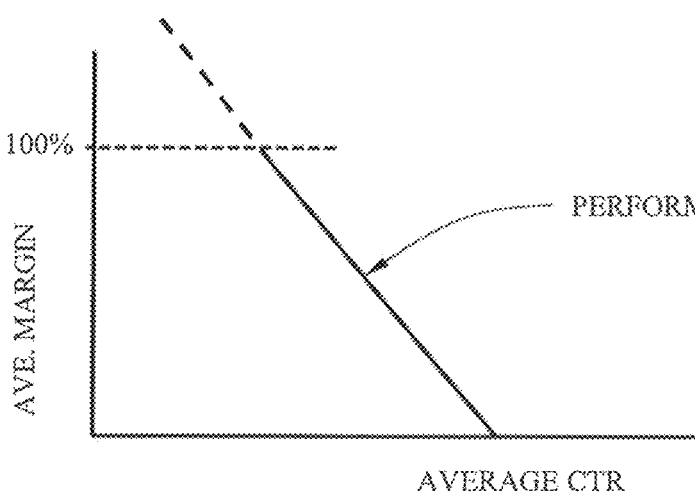
FIG. 8 is a performance curve characterizing the overall performance, in accordance with the preferred embodiment of the present invention.

Illustrated in FIG. 8 is a performance curve characterizing the overall performance of the DBP of the preferred embodiment. The performance curve illustrates the balance between the average click-through rate and the average margin as a percentage of the amount paid by the advertiser to serve the ad. As illustrated, the highest click-through rates are generally achievable at the highest cost to acquire the impression. In this scenario, the maximum achievable action rate is acquired at little or no profit. On the other hand, the maximum margin corresponds to a reduced action rate, which is illustrated by the cap corresponding to 100% margin.

In the preferred embodiment described herein, the metric of ad engagement is the CTR. In other embodiments, ad engagement or performance more generally is measured in different terms based on the content of the ad, for example. If the ad includes a consumer product, ad performance may be measured by conversions, i.e., sales of the product following the ad impression. If the ad includes a mobile software application, for example, ad performance may be measured in terms of the download rate, i.e., the rate at which people download and/or install the application after seeing the ad. If the ad includes a video, for example, ad performance may be measured in terms of the rate at which recipients watch the complete video. Ad performance may be based on other actions including a) entering an email address, b) taking an action on a web site, c) calling a phone number, d) filling out a form, e) visiting a location, f) adding an event to a calendar, etc.

In some embodiments, the dynamic bidding platform (DBP) of the present invention is configured to optimize the targeting of ad impressions in real-time. For example, the dynamic bidding platform may deliver ad impressions to particular users, determine whether those users took a specific action intended by the ad impressions, and then update or otherwise modify the populations to which the ads are targeted based on which users took specific actions. In the preferred embodiment, the ad impressions incentivize users to go to the advertiser's place of business, and the dynamic bidding platform continually updates the audience to which the ad impressions are delivered in real-time. As a result, the targeting of the ad impressions evolves over the course of an ad campaign and the number of users that visit the advertiser's place of business increases.

Figure 9:
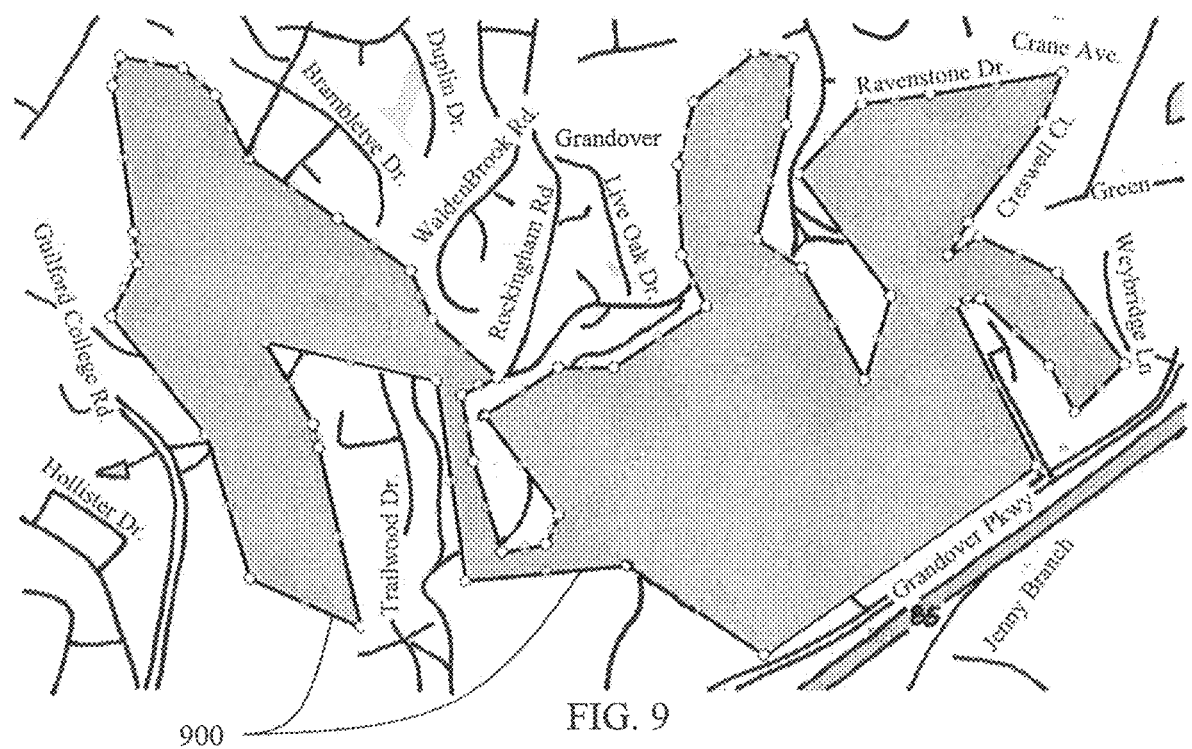
FIG. 9 is a map illustrating a geo-fence boundary drawn around an advertiser's place of business, in accordance with the preferred embodiment of the present invention.
Figure 10:
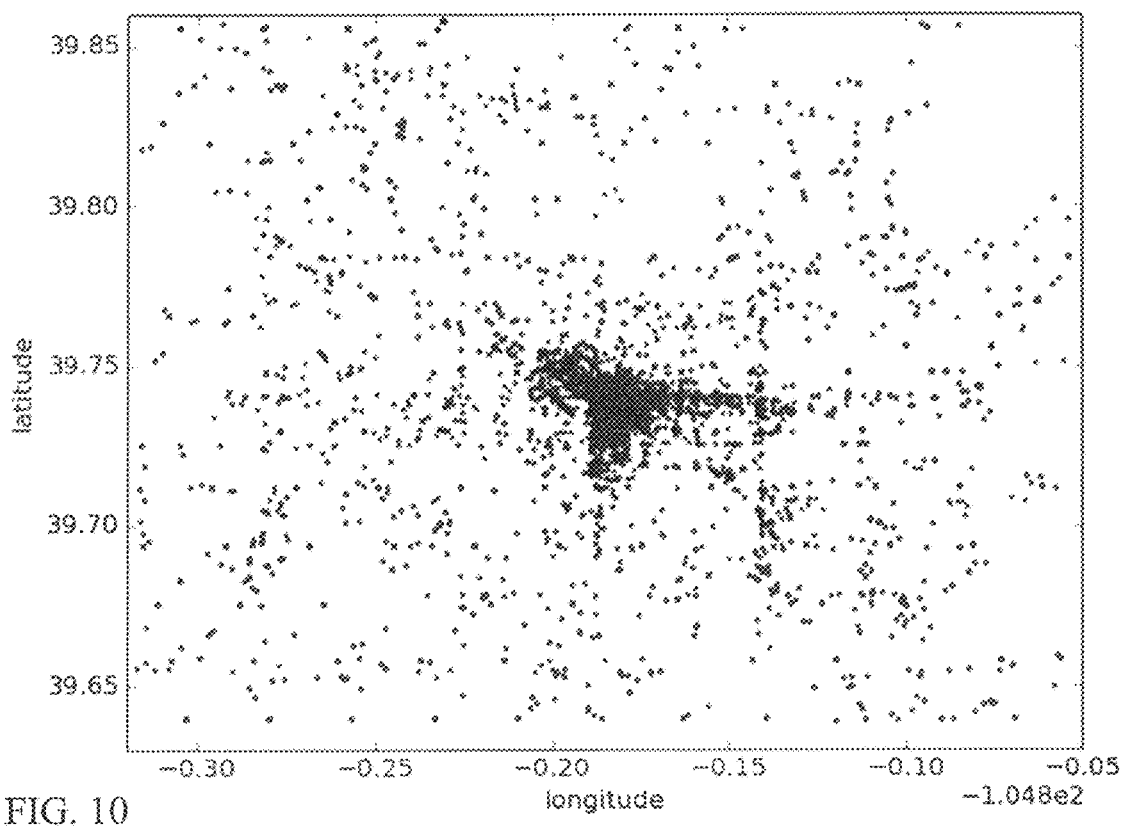
FIG. 10 is a scatter plot illustrating locations of users at specific times after an ad impression, in accordance with the preferred embodiment of the present invention.

Illustrated in FIG. 9 is a geographic map including a geo-fence boundary drawn around an advertiser's place of business. In this example, the place of business is a golf course and the geo-fence 900 follows an irregular contour around the property line. The geo-fence is generally a polygon that is drawn by hand by a person, although it may also be computer-generated in some situations. When a user crosses the boundary defined by the geo-fence, the user is determined to be in the advertiser's place of business. To determine if and when a user has crossed the geo-fence, the dynamic bidding platform may acquire information about mobile phone usage indicating the location of the user when an ad is served, when a software application is launched or requested data, or when a user reports his or her location, for example. A scatter plot illustrating locations of multiple users at specific times after delivery of an ad impression is illustrated in FIG. 10. As shown, there is a concentration of user activity at the center of the figure which coincides with an advertiser's place of business.

Figure 11:
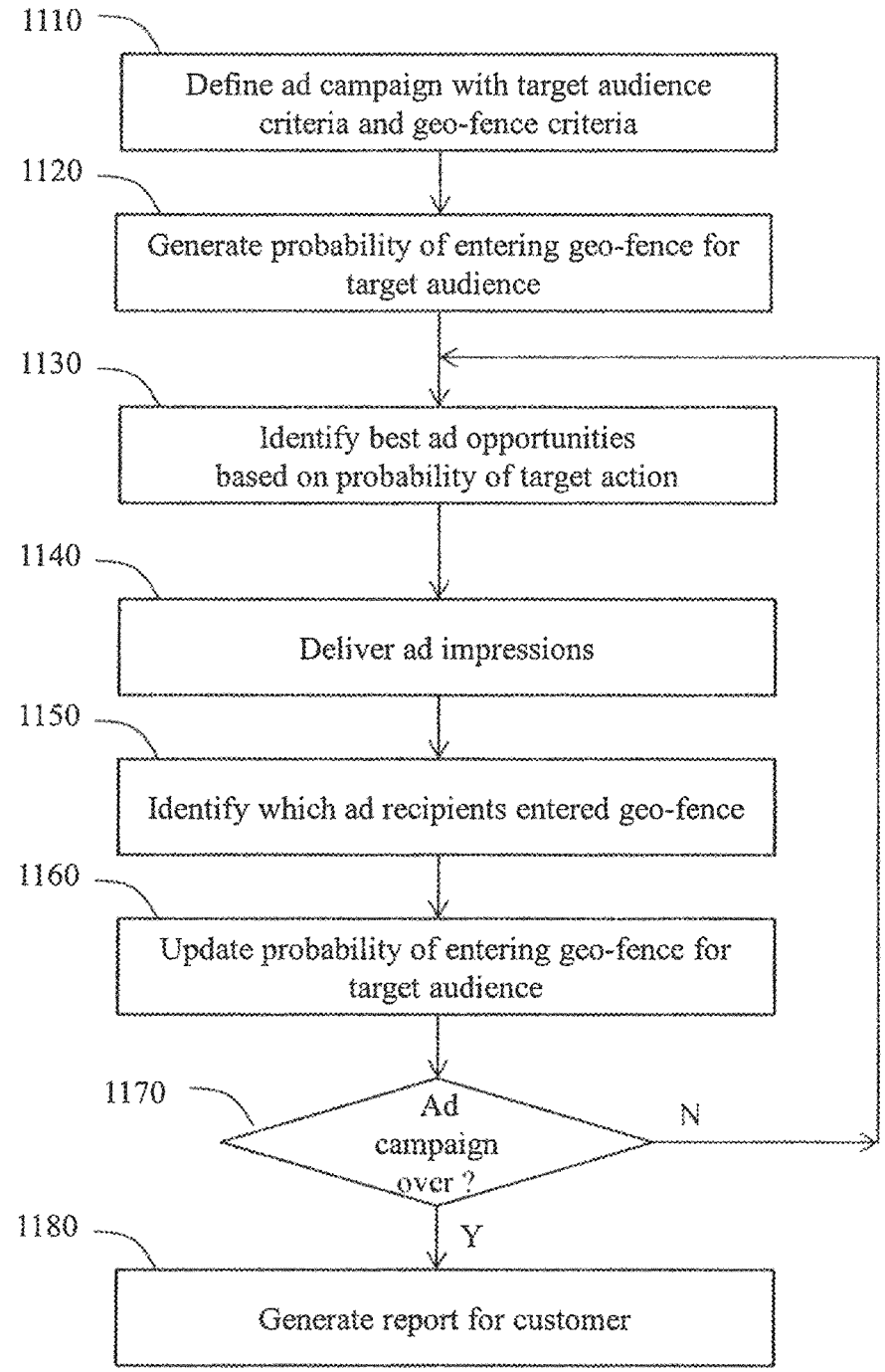
FIG. 11 is a method of real-time optimization of ad targeting, in accordance with the preferred embodiment of the present invention.

Illustrated in FIG. 11 is the method of real-time optimization of ad targeting in the preferred embodiment. The ad campaign is initiated when an advertiser provides 1110 an ad campaign defining the target audience, the electronic ad, and the geo-fence defining the advertiser's business, for example. In addition to the target rate and applicable bidding rule described in FIG. 7, the DBP also generates a probability that an ad recipient will cross the geo-fence for each qualified ad opportunity offered on the real-time bidding network (RBN). The DBP then identifies 1130 the ad opportunities having the best probability of driving the user to the advertiser's place of business. Bids for the ad opportunities having the best chance of success are submitted to the RBN and, if won, are followed by the delivery 1140 of the ad impression.

After the ad impressions are delivered, the DBP determines if and when the users cross the geo-fence associated with the advertiser. Those users are generally determined 1150 by a phone identifier, for example, that can be used to retrieve the probability that the user would cross the geo-fence. That probability is then updated 1160 to reflect the rate at which users are actually crossing the geo-fence. In the preferred embodiment, these probabilities are updated every 10 to 60 minutes, preferably every 15 minutes, until the ad campaign is completed. As the probability estimates are updated, the updated probabilities used to select ad opportunities on which to bid. That is, actual user location data is provided as feedback and used to refine the probabilities in real-time, thereby improving the selection of ad recipients in real-time and increasing traffic to the advertiser's business. At the end of the ad campaign, the DBP may provide 1180 a report indicating success of the advertising campaign and the number of users that crossed the geo-fence as a function of time over the course of the ad campaign.

One or more embodiments of the present invention may be implemented with one or more computer readable media, wherein each medium may be configured to include thereon data or computer executable instructions for manipulating data. The computer executable instructions include data structures, objects, programs, routines, or other program modules that may be accessed by a processing system, such as one associated with a general-purpose computer or processor capable of performing various different functions or one associated with a special-purpose computer capable of performing a limited number of functions. Computer executable instructions cause the processing system to perform a particular function or group of functions and are examples of program code means for implementing steps for methods disclosed herein. Furthermore, a particular sequence of the executable instructions provides an example of corresponding acts that may be used to implement such steps. Examples of computer readable media include random-access memory ("RAM"), read-only memory ("ROM"), programmable read-only memory ("PROM"), erasable programmable read-only memory ("EPROM"), electrically erasable programmable read-only memory ("EEPROM"), compact disk read-only memory ("CD-ROM"), or any other device or component that is capable of providing data or executable instructions that may be accessed by a processing system. Examples of mass storage devices incorporating computer readable media include hard disk drives, magnetic disk drives, tape drives, optical disk drives, and solid state memory chips, for example. The term processor as used herein refers to a number of processing devices including personal computing devices, servers, general purpose computers, special purpose computers, application-specific integrated circuit (ASIC), and digital/analog circuits with discrete components, for example.

Although the description above contains many specifications, these should not be construed as limiting the scope of the invention but as merely providing illustrations of some of the presently preferred embodiments of this invention.

Therefore, the invention has been disclosed by way of example and not limitation, and reference should be made to the following claims to determine the scope of the present invention.

We claim:

1. A computer implemented method comprising:
   collecting, by a dynamic bidding platform (DBP), a plurality of digital ad impression opportunities from a real-time bidding network (RBN) which administers real-time auctions for ad impressions displayed to various users via websites and mobile software applications, wherein each of the plurality of opportunities is associated with criteria defining the opportunity;
receiving, by the DBP, an ad campaign from an advertiser, including: (1) at least one digital ad, (2) campaign criteria set by the advertiser, (3) a target rate for distributing the at least one digital ad, (4) a desired user action in response to receiving the at least one digital ad, and (5) a fee advertiser is willing to pay for each impression of the at least one digital ad upon delivery;
for each digital ad impression opportunity of the plurality of digital ad impression opportunities, determining, by the DBP, whether the digital ad impression opportunity satisfies the received campaign criteria set by the advertiser;
for each of the plurality of digital ad impression opportunities which satisfy the received campaign criteria:
  determining, by the DBP, an expected action rate of the desired user action; and
  determining, by the DBP, an expected margin, for each digital ad impression opportunity,
generating, by the DBP, a plot representing each of the plurality of digital ad impression opportunities which satisfy the received campaign criteria, wherein each of the plurality of digital ad impression opportunities which satisfy the received campaign criteria has its respective determined expected action rate plotted on a y-axis of the plot relative to its respective determined expected margin plotted on an x-axis to form a graphical representation of a number and quality of ad opportunities;
determining, by the DBP, a plurality of candidate bid boundaries, each represented as a straight line, with either flat or negative slop), when mapped on the generated plot, each of which effectively classifies the plurality of digital ad impression opportunities which satisfy the received campaign criteria into two groups: (1) a first class comprising ad opportunities which reside to the upper right side of the respective candidate bid boundary which are deemed opportunities on which to potentially bid, and (2) a second class comprising those ad opportunities which do not reside to the upper right side of the respective candidate bid boundary and as such are deemed ad opportunities on which not to bid;
associating, by the DBP, each of the plurality of candidate bid boundaries with its respective first class of ad opportunities on which to potentially bid;
for each candidate bid boundary's respective associated first class of ad opportunities on which to potentially bid, computing, by the DBP, the total number of the plurality of digital ad impression opportunities, satisfying the received campaign criteria, which reside to the upper right side of the respective candidate bid boundary;
identifying by the DBP, a first subset of the candidate bid boundary lines as those candidate bid boundary lines whose total number characterizing the respective first class of ad opportunities on which to potentially bid meets the received target rate for distributing the at least one digital ad;
for each associated first class of ad opportunities on which to potentially bid, of each candidate bid boundary line identified as part of the first subset, determining, by the DBP, (1) an average expected action rate and (2) an average expected margin;
receiving, by the DBP, a minimum threshold for average expected action rate and a minimum threshold for average expected margin;
from among the candidate bid boundary lines, identified as part of the first subset, determining, by the DBP, a second subset of candidate bid boundary lines comprising those candidate bid boundary lines whose associated first class of ad opportunities on which to potentially bid with a determined average expected action rate and determined average expected margin each respectively exceed the minimum threshold for average expected action rate and minimum threshold for average expected margin;
determining, by the DBP, an optimum bid boundary line from among the determined second subset of candidate bid boundary lines, wherein the optimum bid boundary line is a candidate bid boundary line whose average expected margin is greatest from among the determined second subset of candidate bid boundary lines;
submitting, by the DBP, a bid to the RBN for at least one opportunity associated with the determined optimum bid boundary line's respective first class of ad opportunities on which to potentially bid, wherein the bid is based on the determined optimum bid boundary line;
for a winning bid associated with the at least one opportunity of the determined optimum bid boundary line's respective first class of ad opportunities, transmitting a digital ad impression to a recipient, associated with the at least one opportunity of the respective winning bid, according to terms established with the RBN,
determining, by the DBP, whether the received campaign is completed by determining whether the target rate for distributing the at least one digital ad has been met based upon the transmitting of the digital ad impression to the recipient, associated with the at least one opportunity of the respective winning bid;
identifying whether the recipient who received the digital ad impression subsequently performed the desired user action;
for each of the remaining plurality of digital ad impression opportunities, for which a bid has not been submitted, and which satisfy the received campaign criteria, updating each respective determined expected action rate of each digital ad impression opportunity based on identification of whether the recipient who received the digital ad impression subsequently performed the desired user action; and
if it is determined by the DBP that the received campaign is completed, providing, by the DBP, a report to the advertiser indicating success of the advertising campaign and whether the recipient who received the digital ad impression subsequently performed the desired user action else, determine, by the DBP, a new plurality of candidate bid boundaries.

\* \* \* \* \*